United States Patent
Fujimoto et al.

(10) Patent No.: US 6,927,787 B2
(45) Date of Patent: Aug. 9, 2005

(54) METHOD OF PRINTING DATA ON SHEET

(75) Inventors: Masanori Fujimoto, Kanagawa (JP); Mitsuhiro Igarashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 46 days.

(21) Appl. No.: 10/413,386

(22) Filed: Apr. 15, 2003

(65) Prior Publication Data

US 2004/0174423 A1 Sep. 9, 2004

(30) Foreign Application Priority Data

Mar. 3, 2003 (JP) ........................................ 2003-055425

(51) Int. Cl.$^7$ ............................................... B41J 2/315
(52) U.S. Cl. ...................................................... 347/171
(58) Field of Search ................................. 347/171, 172, 347/222; 400/615.2, 649, 120.02, 103, 104, 76, 61, 62, 65, 586

(56) References Cited

U.S. PATENT DOCUMENTS 5,198,836 A * 3/1993 Saito et al. ................. 347/222
5,890,820 A * 4/1999 Handa ...................... 400/615.2
6,222,570 B1 * 4/2001 Takayama et al. .......... 347/172
6,351,275 B1 * 2/2002 Ayling et al. ............... 347/171
6,682,239 B2 * 1/2004 Mori et al. .................. 400/649

FOREIGN PATENT DOCUMENTS

JP 9-226184 A 9/1997

* cited by examiner

Primary Examiner—K. Feggins
(74) Attorney, Agent, or Firm—Sughrue Mion, PLLC

(57) ABSTRACT

A system for printing data on sheets, which can solve the problem of the waste of paper resources and also improve the printing speed. The second data is printed as background on an area of printing the first data in a mode that the first and second data can be visually discriminated from each other. The sheets are either receipts or train tickets or airplane tickets or entrance tickets. The mode permitting the visual discrimination is one based on density gradation printing. The printing is performed by a thermal printer. The mode permitting the visual discrimination is one based on the difference in density.

26 Claims, 2 Drawing Sheets

FIG.3

```
       START
         ↓
  INPUT SOLD ITEMS         S1
         ↓
  INPUT AMOUNT OF          S2
  DEPOSITED MONEY
         ↓
  DETERMINE SALES          S3
         ↓
  OUTPUT AND               S4
  PRINT BY RECEIPT
```

METHOD OF PRINTING DATA ON SHEET

BACKGROUND OF THE INVENTION

1. Field of the Invention

The present invention relates to a system for printing data on sheets, for example, a system for printing data on receipt sheets or like sheets for reducing the quantity of paper for ticket issuance.

2. Description of the Related Art

The POS system permits various data such as sales data to be obtained in real time and is widely used in various shops such as convenience stores, supermarkets, restaurants and fast-food restraint in view point of sales tactics. The POS system is also used for printing ticket sheets for entrance tickets of concerts, attractions, etc., train tickets and airplane tickets.

In the POS system of this type, a bar code reader in each POS terminal reads out bar codes printed on sales items, thus taking out sales item data and item price data, or each register operator inputs item data and price data by terminal operation. The data taken out or inputted in this way, are fed out from the terminal to a processor as main unit for the execution of POS functions such as item management and sales amount management.

For recording details of sales data of sold items, amounts, etc., a printer is used for printing the sales data on sheets. Data which are printed on sheets are usually of item names, prices, total amounts, consumption taxes, gross total amounts deposited money amounts, change amounts, dates, etc., and are also shop data such as shop names.

FIG. 4 shows an example of receipt printed by a printer, which belongs to a prior art POS terminal. The illustrated sheet is printed and issued in a convenience store. In an uppermost part of the receipt, the shop mark, shop name (or branch name), address and telephone number of the relevant convenience store are printed. In a part right under the horizontal line, the sales date, (and the name of person in charge: name of register operator), and then the names, quantities and prices of the sold items are printed. In a lowermost part, the total amount, the tax and the like, the gross total amount, the deposited amount and the change amount are printed.

The printing mode as shown is adopted not only for receipts for sales data printing in convenience stores, supermarkets, restaurants, fast food stores, etc. but is also adopted for other data sheets as desired, for instance entrance tickets of concerts and attractions. In these sheets, ticket issuance shop data and other data as desired are printed separately from intrinsic data to be printed.

Japanese patent laid-open No. 9-226184 (FIG. 2, paragraphs [0015]–[0021]) (Patent reference 1) discloses a receipt printing system, in which when printing shop data such as the shop data together with letter data in a receipt, image data of the shop data which requires a relatively long printing time is preliminarily read out. This system is an example of printing the shop data in an independent place separate from the item sales data.

SUMMARY OF THE INVENTION

Problems to be Solved by the Invention

As shown in FIG. 4, in the prior art receipt printing, shop data are printed on an upper fixed area of the sheet. The shop data may be printed not only on an upper part but also on a lower part. In either case, the shop data are printed on a place which is separate and independent from item sales data. This is the same with other print sheets including ticket issuance sheets, which are printed in like modes.

As shown above, additional data such as sales shop or issuance shop, which is separate from the intrinsic data to be printed such as sales data, is printed in an (upper or lower) place independent from the intrinsic data. As is seen from FIG. 4, the additional data printing place occupies a considerable part of the sheet as a whole, and this leads to rather wasteful use of paper. In the case of sale of a single item, the receipt sheet is almost occupied by the additional data, which is not only apparent unbalance but is also wasteful. Besides, such a sheet is seldom held by the customer and is in many cases discarded, thus leading to the waste of paper resources. Although the issued tickets are not discarded, they pose like problem in view of the waste of paper resources.

Furthermore, since the addition data are printed in a separate place provided in the printing direction, extra time is needed until the completion of the printing.

The present invention was made in view of the above background affairs, and its object is to provide a system for printing data on sheets, which can solve the problem of the waste of paper resources and also improve the printing speed.

Means for Solving the Problems

In order to solve the above problems, the method of printing data on sheets according to the present invention has the following featured structures.

(1) A method of printing data on sheets, the data being first data as basic data and second data as additional data, wherein:

the second data is printed as background on an area of printing the first data in a mode that the first and second data can be visually discriminated from each other.

(2) The method of printing data on sheets according to the above (1), wherein the printing is performed by a thermal printer, and the mode permitting the visual discrimination is one based on density gradation printing.

(3) The method of printing data on sheets according to one of the above (1) and (2), wherein the printing is done by a printer in a POS terminal unit.

(4) The method of printing data on sheets according to one of the above (1) to (3), wherein the sheets are either receipts or train tickets or airplane tickets or entrance tickets.

(5) The method of printing data on sheets according to one of the above (1) to (4), wherein the mode permitting the visual discrimination is one based on the difference in density or color between the two different kinds of data.

(6) The methods of printing data on sheets according to one of the above (1) to (5), wherein the basic data includes sales date, sales data and sales amount data, and the additional data includes either ticket issuance source mark, shop name (or branch name), address or telephone number.

(7) The method of printing data on sheets according to one of the above (1) to (6), wherein the sheets are made of paper or a plastic material.

BRIEF DESCRIPTION OF THE DRAWINGS

FIG. 3 is a flow chart showing operation processes in the terminal of POS system.

FIG. 4 is a receipt printed by a prior art system.

DETAILED DESCRIPTION OF THE INVENTION

Preferred embodiments of a method of printing data on sheets according to the present invention will now be described with reference to the drawings.

Figure 1:
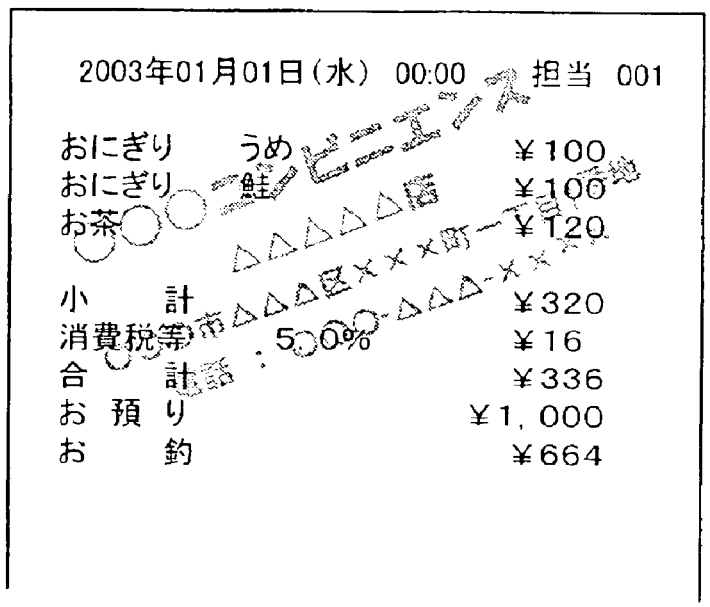
FIG. 1 is a view showing an example of sheet, on which printing is made in an embodiment of the system for printing data on sheets according to the present invention.

FIG. 1 is a view showing an example of sheet, on which printing is made in an embodiment of the system for printing data on sheets according to the present invention.

The present invention is applicable not only to sheets for sales data printing in convenience stores, supermarkets, restaurants, fast food stores, etc. but also to tickets (or ticket issuance sheets) in lieu of entrance tickets of concerts, attractions, etc.

Basically, according to the present invention the above additional data are printed in superimposition on the place of printing of basic data such as sales data, but the additional data are printed as background data of the basic data. The additional data as the background data are printed in such a mode as that they can be visually discriminated from the basic data. Such visual discrimination mode may be one, which utilizes the density difference or color difference between the two different kinds of data.

In the embodiment shown in FIG. 1, sales date and person-in-charge code number are printed as basic data on the uppermost line. Then, as the actual sales data in the basic data, items, amounts, total amounts, tax, gross total amount, deposited amount and change amount are printed, the additional data such as of the shop mark, shop name (or branch name), address, telephone number, etc. are printed as background data in the place of printing of the basic data in such a mode that they can be visually discriminated from the basic data. In the illustrated printing mode, the basic data may be printed in a high density color, and the additional data may be printed in a low density color. In this embodiment, the additional data are printed by density gradation printing as will be described hereinunder.

The color of the additional color may be set to one, which can be visually discriminated as clearly as possible from the basic data. In the case of the discrimination on the basis of the density difference, however, a certain consideration may be necessary. Particularly, it is desired that the POS terminal uses an inexpensive and simple printer. For this reason, a thermal printer is usually used.

The thermal printer has a line head, which has a line-like matrix array of color generation elements, and the density expression printing is performed on the basis of the area gradation, in which the number of color generation dots per unit area is adjusted. When it is desired to provide density differences for small areas satisfactory printing can not be obtained. In the embodiment of the present invention, background printing is made, which does not adopt the area gradation but adopts the density gradation printing. Specifically, gradation values expressed in gray scale are preliminarily judged, and activation time weighted for each bit is partly appropriately changed. In this activation control, desired gradation differences can be obtained without need of considering the physical time of data transfer to the thermal head.

Figure 2:
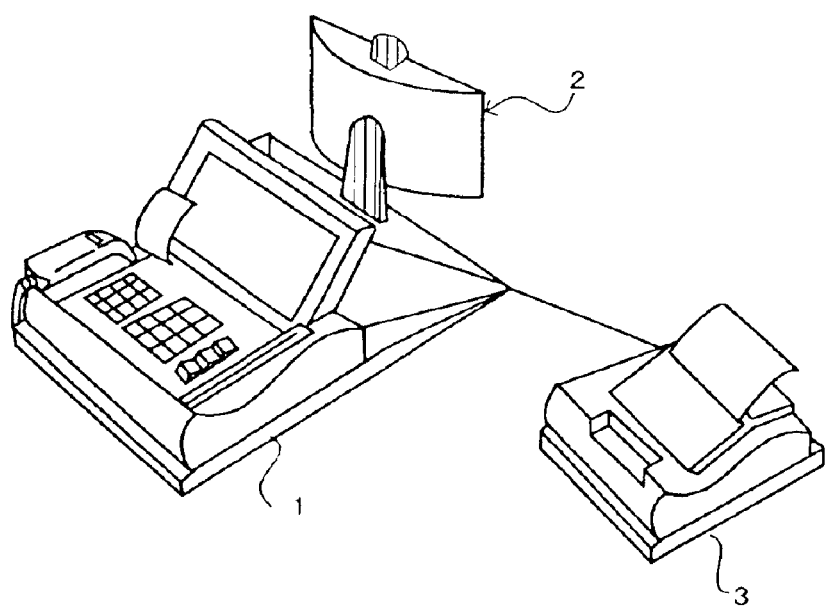
FIG. 2 is a structure of a terminal unit in a POS system.

A terminal unit in a POS system according to the present invention, as shown in FIG. 2, comprises a POS terminal 1, a liquid crystal or like display 2 and a printer 3 used for receipt printing. FIG. 3 shows the flow of process in the POS system based on operator's operations.

Referring to FIG. 3, after POS system operation start, the operator inputs sold items (step S1), then inputs the amount of money deposited by the customer (step S2), and then determines the sales (step S3). Thereafter, the operator executes printing on a receipt in the mode according to the present invention, and outputs the print thus obtained (step S4). The operator then returns to the process in the step S1, and waits for the process with respect to a next customer.

While in the above embodiment a receipt is described as an example of sheet, this is by no means limitative, and the present invention is also applicable to other ticket issuance sheets as desired, such as train tickets, airplane tickets and entrance tickets. Also the medium of printing is not limited to paper, but may also be sheets of other materials as desired, such as plastics.

Although the method of printing data on sheets has been described, this is offered by way of illustration only.

Advantages of the Invention

As has been described in the foregoing, with the method of printing data on sheets according to the present invention, the following pronounced effects are obtainable. Unlike the prior art printing of additional data of sales shop or ticket issuance shop, which are separate from basic data such as sales data, on a separate independent place, the additional data are printed in superimposition on background in such a mode that they can be readily visually discriminated. Thus, the printing area of the sheet may only be the basic data printing place, and unlike the prior art no independent place for additional data printing is necessary. Thus not only it is possible to greatly reduce the quantity of paper used and cost, but it is also possible to obtain a pronounced effect of reducing the time until completion of the printing.

What is claimed is:

1. A method of printing data on a sheet to form a sales receipt, the data including first receipt data as basic data and second receipt data as additional data, comprising:

printing the first receipt data on the sheet; and printing the second receipt data on the sheet as background on an area of the first receipt data such that the first and second data are visually discriminated from each other to form information of the sales receipt.

2. The method of printing data according to claim 1, wherein the printing is performed by a thermal printer, and the mode permitting the visual discrimination is one based on density gradation printing.

3. The method of printing data according to claim 1, wherein the printing is done by a printer in a POS terminal unit.

4. The method of printing data according to claim 1, wherein the sales receipt is a train ticket or airplane ticket or entrance ticket.

5. The method of printing data according to claim 1, wherein the mode permitting the visual discrimination is one based on a difference in density or color between the first data and the second data.

6. The method of printing data according to claim 1, wherein the sales receipt comprises basic data including sales date, sales data and sales amount data, and the additional data includes either a ticket issuance source mark, shop name branch name, address or telephone number.

7. The method of printing data according to claim 1, wherein the sheet is made of paper or a plastic material.

8. The method of printing data according to claim 1, wherein the second receipt data is printed diagonally with respect to the first receipt data.

9. A method of printing data on a sheet to form a ticket, the data including first ticket data as basic data and second ticket data as additional data, comprising:

printing the first ticket data on the sheet; and printing the second ticket data on the sheet as background on an area of the first ticket data, such that the first ticket data and the second ticket data are visually discriminated from each other to form information of either a train ticket or an airplane ticket or an entrance ticket.

10. The method of printing data according to claim 9, wherein the printing is performed by a thermal printer, and the mode permitting the visual discrimination is one based on density gradation printing.

11. The method of printing data according to claim 9, wherein the printing is done by a printer in a POS terminal unit.

12. The method of printing data according to claim 9, wherein the mode permitting the visual discrimination is one based on a difference in density or color between the two different kinds of data.

13. The method of printing data according to claim 9, wherein the sheet is made of paper or a plastic material.

14. The method of printing data according to claim 9, wherein the second ticket data is printed diagonally with respect to the first ticket data.

15. A method of printing data on a sheet including first sales data as basic data and second data as additional data, comprising:

printing the first sales data on the sheet, including sales date, sales data and sales amount data; and printing the second data as background on an area of the first data such that the first and second data are visually discriminated from each other, the second data including either a ticket issuance source mark, shop name, branch name, address or telephone number.

16. The method of printing data according to claim 15, wherein the printing is performed by a thermal printer, and the mode permitting the visual discrimination is one based on density gradation printing.

17. The method of printing data according to claim 15, wherein the printing is done by a printer in a POS terminal unit.

18. The method of printing data according to claim 15, wherein the mode permitting the visual discrimination is one based on a difference in density or color between the two different kinds of data.

19. The method of printing data according to claim 15, wherein the sheet is made of a paper or a plastic material.

20. The method of printing data according to claim 15, wherein the second data is printed diagonally with respect to the first sales data.

21. A receipt comprising;

a sheet;

first printed data on the sheet; and second printed data disposed on the sheet as background on an area where the first printed data is provided, wherein the first printed data and the second printed data can be visually discriminated, and at least one of the first printed data and the second printed data includes sales information of the receipt.

22. The receipt according to claim 21, wherein the receipt is a train ticket or airplane ticket or entrance ticket.

23. The receipt of claim 21, wherein the first printed data and the second printed data are visually discriminated based on a difference in density or color.

24. The receipt of claim 21, wherein the first printed data comprises sales date, sales data and sales amount data, and the second printed data includes either a ticket issuance source mark, shop name, branch name, address or telephone number.

25. The receipt of claim 21, wherein the sheet is made of paper or a plastic material.

26. The receipt of claim 21, wherein the second printed data is diagonally positioned with respect to the first printed data.

* * * * *